United States Patent
Lyman et al.

(10) Patent No.: US 9,933,943 B2
(45) Date of Patent: *Apr. 3, 2018

(54) CONFIGURATION OF A PHYSICAL CONTROL UNIT TO SUPPORT MULTIPLE LOGICAL CONTROL UNITS FOR DIFFERENT TAPE DRIVE TYPES IN A MAINFRAME NATIVE TAPE ATTACHMENT STORAGE SYSTEM

(71) Applicant: International Business Machines Corporation, Armonk, NY (US)

(72) Inventors: Joel K. Lyman, Tucson, AZ (US); Spencer G. Mower, Tucson, AZ (US); Arthur W. Stillwell, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,931

(22) Filed: Jun. 24, 2016

(65) Prior Publication Data
US 2016/0357449 A1    Dec. 8, 2016

Related U.S. Application Data

(63) Continuation of application No. 13/952,297, filed on Jul. 26, 2013, now Pat. No. 9,378,767.

(51) Int. Cl.
*G06F 3/06*    (2006.01)
*G11B 27/02*    (2006.01)
(Continued)

(52) U.S. Cl.
CPC ............ *G06F 3/0607* (2013.01); *G06F 3/061* (2013.01); *G06F 3/067* (2013.01); *G06F 3/0629* (2013.01);
(Continued)

(58) Field of Classification Search
CPC ...... G06F 3/061; G06F 3/0626; G06F 3/0605; G06F 3/067; G06F 3/0655; G06F 3/0664; G06F 3/0629; G06F 3/0635
See application file for complete search history.

(56) References Cited

U.S. PATENT DOCUMENTS 5,257,368 A    10/1993    Benson et al.
5,327,535 A    7/1994    Ogata et al.
(Continued)

OTHER PUBLICATIONS

IBM Support, "Configuring TS35xx or TS34xx Tape Libraries on a System i," Apr. 16, 2013.*

*Primary Examiner* — Michael Krofcheck
(74) *Attorney, Agent, or Firm* — Griffiths & Seaton PLLC

(57) ABSTRACT

A tape storage system having a physical control unit configured to support multiple logical control units is provided. Each logical control unit supports communication with a single tape drive model type up to a maximum number of drives. A customer obtains a number N of logical control units through purchase, lease or other legitimate avenues. Based on the number of tape drive model types L and the number of tape drives for each type $Q_L$, the model types are mapped to the N LCUs. In general, mapping priority is given to the newer generation model types and the model types in which the number of attached tape drives $Q_L$ exceeds the capacity M of a single LCU. An exception being that the oldest model type is ensured a mapping to an LCU. The LCUs may be reconfigured and the model types remapped on the physical CU if the customer adds different model types to the storage system or obtains a different number of LCUs.

12 Claims, 4 Drawing Sheets

(51) Int. Cl.
    *G11B 27/00*     (2006.01)
    *G06F 12/10*     (2016.01)
    *G07F 17/00*     (2006.01)

(52) U.S. Cl.
    CPC .......... *G06F 3/0658* (2013.01); *G06F 3/0664* (2013.01); *G06F 3/0686* (2013.01); *G06F 12/10* (2013.01); *G11B 27/002* (2013.01); *G06F 2212/1004* (2013.01); *G06F 2212/152* (2013.01); *G06F 2212/165* (2013.01); *G06F 2212/213* (2013.01); *G06F 2212/70* (2013.01); *G07F 17/005* (2013.01); *G07F 17/0014* (2013.01); *G11B 2220/41* (2013.01); *G11B 2220/90* (2013.01)

(56) References Cited

U.S. PATENT DOCUMENTS

| | | |
|---|---|---|
| 5,416,914 A | 5/1995 | Komgiebel et al. |
| 5,615,352 A | 3/1997 | Jacobson et al. |
| 6,246,770 B1 | 6/2001 | Stratton et al. |
| 6,675,260 B2 | 1/2004 | Torrey et al. |
| 6,748,557 B1 | 6/2004 | Beardsley et al. |
| 6,854,052 B2 | 2/2005 | Beeston et al. |
| 7,308,528 B2 | 12/2007 | Kitamura et al. |
| 7,567,886 B2 | 7/2009 | Beeston et al. |
| 7,873,503 B2 | 1/2011 | Loomans et al. |
| 2004/0006702 A1 | 1/2004 | Johnson |
| 2004/0203941 A1 | 10/2004 | Kaplan et al. |
| 2005/0226105 A1 | 10/2005 | Gregg et al. |
| 2009/0193140 A1 | 7/2009 | Ageyev et al. |

\* cited by examiner

CONFIGURATION OF A PHYSICAL CONTROL UNIT TO SUPPORT MULTIPLE LOGICAL CONTROL UNITS FOR DIFFERENT TAPE DRIVE TYPES IN A MAINFRAME NATIVE TAPE ATTACHMENT STORAGE SYSTEM

BACKGROUND

Field of the Invention

The present invention relates to mainframe native tape attachment storage systems built from legacy designs in which the host functions with storage subsystems (Control Units (CUs)) that are each attached to a maximum number of tape drives of the same model type, and more specifically, to the configuration of a single physical CU to support multiple logical control units (LCUs) for different tape drive model types in which each LCU is attached to a maximum number of tape drives of the same model type.

Description of the Related Art

In a mainframe native tape attachment storage system, a host communicates directly with a physical tape drive via a physical control unit (CU). The host and physical CU are different types of computer servers. The host runs an operating system such as z/OS or z/Linux. The host is connected through a storage area network (SAN) to one or more physical CUs. Each physical CU is attached via a customer provided SAN, embedded switches or cables to a number of tape drives. The host operating systems have been built from legacy designs to function with CUs containing up to 16 tape drives of the same model type. The CU cannot accommodate greater than 16 tape drives or drives of different model types (e.g. different generations). If the customer has more than 16 tape drives of a given model type or tape drives of different model types, the customer has to purchase and configure multiple physical CUs.

The host defines a group of devices of the same type as a CU. The definition contains the address of the CU. Each tape drive is addressed with a device id (e.g. an offset from the CU's address). For example, a CU may have an address 1B0X where the address is in hexadecimal and the "X" is the offset of the tape drive to be addressed. The tape drives may have addresses 1B00, 1B01, 1B02 and so forth. The host addresses the physical CU and the device id tells the CU which drive is being addressed. This is done by using an inter system communication protocol such as Fibre Connection (FICON) or Small Computer System Interface Logical Unit Number (SCSI LUN) that supports addressing end points by group and then by device. When the host addresses the CU, the CU checks the device id and communication is sent to the appropriate physical tape drive. The CU translates between the FICON traffic that the host understands and the Fiber Channel Protocol (FCP) traffic that the drive understands. The CU is attached to a maximum of 16 drives via a FCP interface. Between the CU and the tape drives is an FCP fabric. There are several forms this can take; in the simplest form this could be nothing more then a cable between the CU and a single drive. It could also be a set of redundant FCP switches or some larger FCP storage area network.

To add a new tape drive to an existing CU, assuming the CU has not reached capacity and the new tape drive is the same model type as the group of drives, the tape drive is physically connected to the physical CU via the FCP fabric. The CU is instructed through service menus to discover the newly attached tape drive. Once configured on the CU, the new tape drive is available for the host to bring online and start using.

To accommodate different model types of tape drives or a number of tape drives in excess of 16, additional CUs must be brought online. The hardware for another physical CU needs to be installed, cabled and powered. A physical CU resides in a frame in a customer's data center. The frame is about 6 feet tall and weighs several hundred pounds. A typical frame will hold 4 physical CUs. Once the hardware is installed, service personnel install microcode on the CU and verify the CU is able to see the attached tape drives. The host defines the group of attached devices as a CU including the addresses of the CU and the device ids for each attached tape drive.

BRIEF SUMMARY

To achieve greater storage performance, flexibility, cost-effectiveness and reliability for customers, a variety of improvements to storage environments, and particularly to mainframe native storage attachment storage systems, continue to be made.

According to one embodiment of the present invention, a single physical CU is configured to support N logical control units (LCUs) with each LCU supporting communication with a single model type of tape drive and a maximum of M drives. Based on the number of tape drive model types L and the number of tape drives for each type $Q_L$, the model types are mapped to the N LCUs with priority given to the newer generation model types and the model types where the number of attached tape drives $Q_L$ exceeds the capacity M of a single LCU. An exception to the general priority being that the oldest model type is mapped to an LCU immediately after the newest model type to ensure the greatest backward compatibility. The tape drives are then assigned to the LCUs based on their model type. The tape drives may also be assigned to balance the allocation of drives of the same model type among multiple LCUs and based on the physical location of the tape drives in different frames to improve redundancy.

According to another embodiment of the present invention, feature codes for N LCUs purchased, leased, or otherwise legitimately obtained by a customer are issued and entered into the physical CU to enable configuration of the N LCUs. The purchase and issuance of the feature codes is implemented via a point-of-sale (POS) module located either remotely or within the physical CU itself. The customer may select the number of LCUs N based at least in part on the number of model types of tape drives L and the number of tape drives $Q_L$. The POS module may implement an algorithm to suggest the number of LCUs N based on L, $Q_L$ and one or more constraints. The constraints may, for example, specify N as the minimum number of LCUs required to map and assign all of tape drives, or all tape drives plus a specified expansion capability for newer or more highly populated model types, or all of the tape drives newer than a specified generation plus the oldest generation or all model types of tape drives. The customer may override the suggested number to select either a greater or lesser number of LCUs based, for example, on the customer's knowledge of plans for future expansion or cost.

According to an embodiment of the present invention, if the customer connects a tape drive of a different model type to the physical CU changing the number of model types L, the model types are remapped to the N LCUs based on the new number of model types and the individual tape drives are reassigned to the LCUs based on model type.

According to an embodiment of the present invention, if the customer obtains a different plurality N of LCUs, the physical CU is reconfigured to support the different number of LCUs N, the model types are remapped to the N LCUs based on the new number of LCUs and the individual tape drives are reassigned to the LCUs based on model type.

According to another embodiment of the present invention, the model types are mapped to different LCUs based on whether the number of purchased LCUs N is equal to, greater than or less than the number of model types L. If equal, each model type is assigned one LCU. If N>L, each model type is mapped to a different LCU and the model types whose number of attached tape drives exceed the capacity of a single LCU are mapped to an additional LCU with priority given to the newest model types. Either the highest populated model types (newest to oldest) or the newest model type are mapped to any remaining LCUs. If N<L, the newest model type is mapped to an LCU, then the oldest model type is mapped to a different LCU, and then the model types are mapped newest to oldest until all the LCUs are assigned.

According to another embodiment of the present invention, the model types are mapped to different LCUs to first ensure that the newest and oldest generation model types are assigned to LCUs, then the model types newer to older are assigned an LCU, then all of the model types with a number of attached tape drives that exceeds the capacity of the LCU are assigned another LCU (with priority from newest to oldest), then any remaining LCUs are assigned to either the highest populated model types (newest to oldest) or to the newest model type.

Related system and computer program product embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The illustrated embodiments below describe a mainframe native tape attachment storage system, for example. The illustrated embodiments provide for the configuration of a single physical CU to support multiple LCUs for different tape drive model types as will be further described, following. The illustrated embodiments improve storage performance, flexibility and cost-effectiveness for communication between an end host and a plurality of attached tape drives of different model types. Performance is enhanced by configuring the LCUs to both support the existing model types and provide for future expandability to attach tape drives within the existing model types. Flexibility is improved by allowing a customer to purchase, lease, or otherwise legitimately obtain a number of LCUs and reconfigure an existing physical CU rather than having to purchase and install additional hardware. The cost to the customer of purchasing, installing and operating additional physical CUs is eliminated. This cost includes the actual cost of the physical CU, licensing costs associated with the host protocol (e.g. FICON) for each physical CU, floor space for the physical CU, power to operate the CU and thermal handling of the CU.

Figure 1:
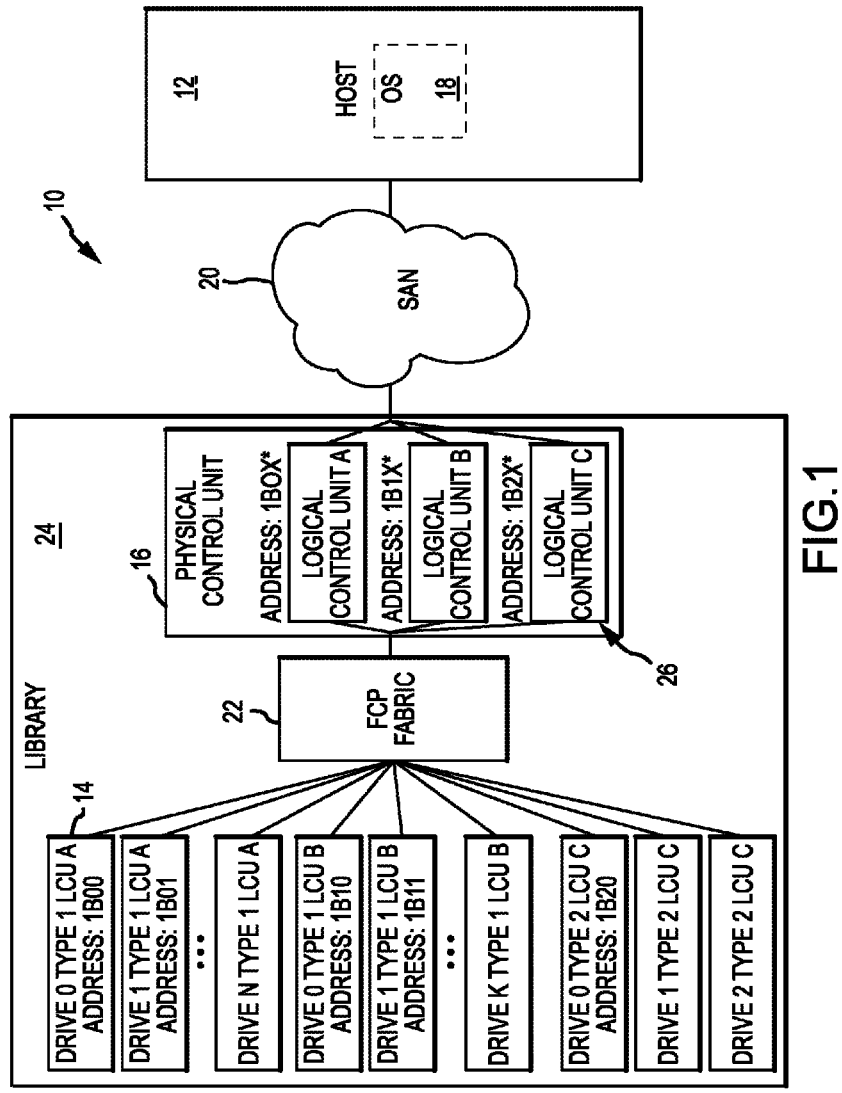
FIG. 1 is a diagram of an embodiment of a mainframe native tape attachment storage system including a physical control unit configured to support multiple logical control units.

With reference now to FIG. 1, in an embodiment of a mainframe native tape attachment storage system 10, a host 12 communicates directly with a physical tape drive 14 via a physical control unit (CU) 16. Host 12 is a computer server that runs an operating system 18 such as z/OS or z/Linux. Host 12 is connected through a storage area network (SAN) 20 to physical CU 16. Physical CU 16 is attached via an FCP fabric 22 to a number of tape drives 14 of different model types. FCP fabric 22 may include a customer provided SAN, embedded switches or cables to a number of tape drives. The numbers of drives are limited if using cables. The different model types may, for example, be IBM tape drives E07, E06, E05, and J1A. These model types are of different generations; some newer and some older.

In an embodiment, all the attached tape drives 14 would be contained within a single Library 24. A library can be thought of as a collection of tapes from which any one tape contained within the library could be mounted in any given drive within the library assuming the tape and drive in question are compatible. One class of library is a stand-alone/rack-mount configuration (manual library). In this configuration the drives are human accessible and tapes are on shelves in the room. The drive will indicate to a human operator to find tape X and insert it into the drive. The second class of library is an automated tape library. An automated tape library (ATL) is series of 1 or more units that are physically attached together, each library unit holding some number of tape drives. Though automated means all attached units can move any given tape from one library unit to any other attached library unit for storage or use in any of the tape drives located within the library unit.

The host operating systems 18 such as z/OS and z/Linux have been built from legacy designs to function with CUs containing up to 16 tape drives of the same type. The CU cannot accommodate more than 16 tape drives or drives of different model types (e.g. different generations).

In accordance with the invention, physical CU 16 is configured to support N logical control units (LCUs) 26. Each LCU 26 supports communication with a single model type of tape drive and a maximum of M tape drives where M equals 16 in existing systems. This number could be higher than 16 in future systems and should not be seen as limiting. Multiple LCUs 26 may support different attached tape drives of the same model type. For example, tape drives 14 of model type 1 are mapped and then assigned to both LCUs A and B with each physical drive existing in only one LCU. In this case, the single physical CU can support multiple LCUs for a number of tape drives of the same type in excess of the maximum capacity of M=16. Different LCUs 26 may support different attached tape drives of different model types. For example, tape drives 14 of model type 1 are mapped and then assigned to LCUs A and B and tape drives 14 of model type 2 are assigned to LCU C. In this case, the single physical CU can support different tape drive model types.

To host 12 the multiple LCUs 26 and their assigned tape drives 14 appear exactly the same as would a conventional storage system having a different physical CU for each group of tape drives of the same model type. The host knows to communicate with an address at the other end of a cable. The host has no visibility of what that address physically is, the address could be a physical CU or one of many LCUs existing on one physical CU. For example, LCU A may have an address 1B0X where the address is in hexadecimal and the "X" is the offset of the tape drive to be addressed. The tape drives assigned to LCU A may have addresses 1B00, 1B01, 1B02 and so forth. Similarly LCU may have an address 1B1X and the tape drives assigned to LCU B may have addresses 1B10, 1B11, 1B12 and so forth.

The advantages provided the customer in reduced hardware costs are clear. The customer can reconfigure an existing physical CU instead of purchasing and installing additional physical CUs. The direct cost savings is considerable. The indirect cost savings for reduced rack space, power consumption and thermal handling are also considerable.

Another very significant advantage is the reduction in license fees for switches with FICON support, which have a high licensing cost per port. When connecting to the FICON switches a single CU will take a maximum of 4 ports in the switch where it also has a minimum of 2 ports. This would indicate that a customer who decided to replace 3 minimally configured physical CUs with 1 maximally CU running 3 LCUs would decrease from a minimum of 6 ports to 4 ports.

Another advantage is that the LCUs may be reconfigured and the model types remapped on the physical CU. If the customer adds different model types to the storage system purchases, leases or otherwise legitimately obtains a different number of LCUs, the LCUs can be reconfigured, remapped and reassigned.

The number of LCUs N and the mapping of those N LCUs to the different model types is configured to support both the existing model types and attached tape drives and to provide for future expandability of additional tape drives within the existing model types. Furthermore, if different model types are attached, the same or different number of LCUs can be reconfigured within the same physical CU.

Figure 2:
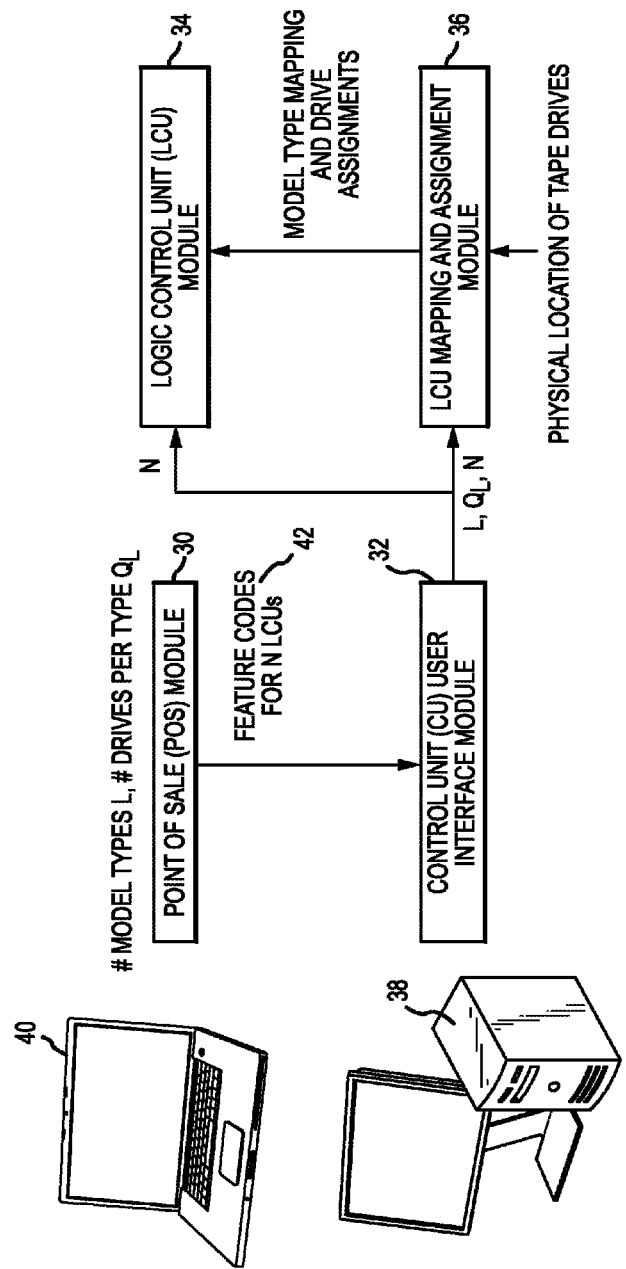
FIG. 2 is a diagram of an embodiment of various software modules for configuration of the physical control unit to support multiple logical control units.

With reference now to FIG. 2, an embodiment for configuring a physical CU to support N LCUs and to map the L model types and $Q_L$ tape drives for each model type to the N LCUs comprises four functional modules: a Point-of-Sale (POS) Module 30, a Control Unit User Interface Module 32, a Logical Control Unit Module 34 and an LCU Mapping & Assignment Module 36. The Control Unit User Interface, LCU and LCU Mapping & Assignment Modules are suitably software modules implemented by a physical CU 38, which itself is a computer server. The POS Module is suitably a software module implemented either in the physical CU, possibly as part of the User Interface Module, or in a separate computer 40. The POS Module computer may be at located with the provider of the physical CU and capability to configure it to support multiple LCUs and tape drives. For example the POS Module computer is remotely located at an IBM site while the physical CU is located at a customer site.

In an embodiment, POS Module 30 issues features codes 42 for the physical CU 38. Feature code 42 is an encrypted string that contains information that the code came from the provider of the LCUs (e.g. IBM®) and that the customer did in fact legitimately obtain the N LCUs, a serial number of the physical CU 38 and the number of LCUs N purchased or leased or otherwise legitimately obtained by the customer. The provider may charge based on the number of LCUs N obtained, the number of model types L supported, the total number of tape drives attached or a combination thereof.

The number of LCUs N purchased, leased or otherwise obtained by the customer can be determined in a variety of ways depending in part on whether the POS Module is remote with the provider or local as part of the physical CU. The customer may simply specify the number of LCUs N. The customer may select the number of LCUs N based at least in part on the number of model types of tape drives L and the number of tape drives $Q_L$, and possibly cost. The POS module may implement an algorithm to suggest the number of LCUs N based on L, $Q_L$ and one or more constraints. The constraints may, for example, specify N as the minimum number of LCUs required to map and assign all of tape drives, or all tape drives plus a specified expansion capability for newer or more highly populated model types, or all of the tape drives newer than a specified generation plus the oldest generation or all types of tape drives. This algorithm may use the mapping algorithms illustrated in FIGS. 3 and 4 to determine the number N given the constraint. The customer may override the suggested number to select either a greater or lesser number of LCUs based, for example, on the customer's knowledge of plans for future expansion or cost. For a remote POS Module, the customer would provide the provider with L and $Q_L$. For a local POS Module implemented with the physical CU, the customer may input the information or the physical CU may be configured to recognize the attached tape drives to determine L and $Q_L$.

Control Unit User Interface Module 32 receives and validates feature codes 42 to allow configuration of the physical CU to install N LCUs. The number of LCUs N and the serial number are saved by the physical CU in a persistent manner. At configuration time, the CU checks the total number N and uses it to install the LCUs. The User Interface Module 32 also provides the number of model types L and the number of tape drives per model type $Q_L$. The customer may enter this information via service menus or the hardware may be configured to automatically recognize the attached drives.

LCU Module 34 provides the ability to respond to multiple addresses in order to emulate multiple LCUs on a single physical CU. The LCU Module 34 configures the physical CU with a range of addresses, each one representing a different LCU. The physical CU is able to respond as needed to any of the configured target address. The LCU Module 34 would also assign each tape drive to one of the LCUs based on the model type mapping and drive assignments provided by the LCU mapping and assignment module 36. The LCU Module 34 would also handle the mapping between the LCU's target address and the attached taped drives.

LCU Mapping & Assignment Module 36 receives as inputs the number of LCUs N, the number of model types L and the number of drives per model type $Q_L$ and outputs the model type mapping and drive assignments. Based on the number of tape drive model types L and the number of tape drives for each type $Q_L$, the Module 36 maps the model types to each of the N LCUs with priority given to the newer generation model types and the model types where the number of attached tape drives $Q_L$ exceeds the capacity M of a single LCU. An exception to the general priority being that the Module 36 maps the oldest model type to an LCU once the newest model type is mapped to ensure the greatest backward compatibility. Either the newest model type or the model types having the highest number of drives per LCU (newest to oldest) are mapped to any remaining LCUs. The Module 36 assigns tape drives to the LCUs based on their model type. The Module 36 may assign tape drives to balance the allocation of drives of the same model type among multiple LCUs and may account for the physical location of the tape drives in different frames to improve redundancy.

According to an embodiment of the present invention, if the customer connects a tape drive of a different model type to the physical CU changing the number of model types L, the model types are remapped to the N LCUs based on the new number of model types and the individual tape drives are reassigned to the LCUs based on model type.

According to an embodiment of the present invention, if the customer purchases or leases or otherwise obtains a different plurality N of LCUs, the physical CU is reconfigured to support the different number of LCUs N, the model types are remapped to the N LCUs based on the new number of LCUs and the individual tape drives are reassigned to the LCUs based on model type.

Figure 3:
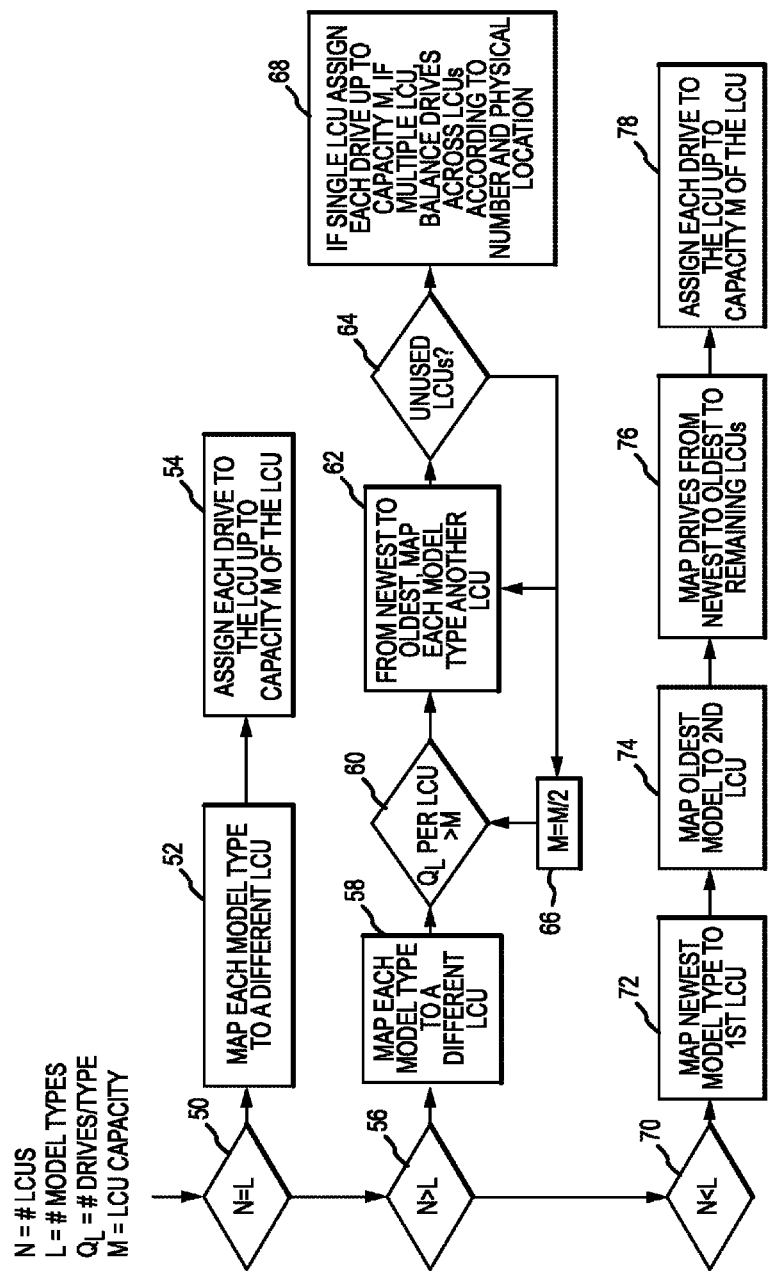
FIG. 3 is a flow diagram of an embodiment for mapping the different tape drive model types to the multiple logical control units.

With reference to FIG. 3, an embodiment of the LCU Mapping & Assignment Module maps the model types to different LCUs based on whether the number of LCUs N obtained is equal to, greater than or less than the number of types of tape drives L. If equal, each model type is mapped to one LCU. If N>L, each model type is mapped to a different LCU and the model types whose number of attached tape drives exceed the capacity of a single LCU are mapped to another LCU with priority given to the newest model types. Either the highest populated model types per LCU (newest to oldest) or the newest model type are mapped to any remaining LCUs. If N<L, the newest model type is mapped to an LCU, then the oldest model type is mapped to a different LCU, and then the model types are mapped newest to oldest until all the LCUs are mapped.

In an embodiment, the Module 36 implements the following steps to map L model types of $Q_L$ tape drives to N LCUs where each LCU can support a maximum of M tape drives of the same model type. The Module 36 determines whether N=L (step 50), if yes the Module 36 maps each model type to a different LCU (step 52) and assigns each tape drive to an LCU based on model type up to the capacity M of the LCU (step 54). If any of the model types have more than M attached tape drives, those tape drives will be left unassigned.

If no, the Module determines whether N>L (step 56) and if yes maps each model type to a different LCU (step 58). The remaining N−L LCUs are allocated by first identifying the model types that have more than M attached tape drives (step 60). Those model types (from newest to oldest) are mapped to another LCU (step 62). If there are unused LCUs (step 64), the Module 36 may either reduce the threshold by, for example, dividing M by 2 (step 66) and repeating steps 60 and 62 to map model types whose $Q_L$ per LCU is greater than the threshold (from newest to oldest) to another LCU or map the model types from newest to oldest to another LCU (step 62) regardless of the number of attached drives pre LCU or map the newest model type to all remaining LCUs. The Module 36 assigns each tape drive to an LCU based on model type (step 68). If a model type has been mapped to multiple LCUs, the Module 36 may balance the number of tape drives assigned to the LCUs and/or take into account the drives physical location to place drives from the same frame with different LCUs. Every model type is guaranteed to be mapped to at least one LCU. The newest model types whose number of attached drives exceeds the capacity of an LCU will be mapped to a second LCU. Depending on the size of N, all drives may be mapped to an LCU and remaining LCUs may be mapped to provide for future expansion. The mapping for future expansion is based on either the newness of the model type, the number of drives attached to the model type, or both.

If no, the Module determines that N<L (step 70) and maps the newest model type to an LCU (step 72), maps the oldest model type to an LCU (step 74) and maps the remaining model types from newest to oldest until the LCUs are exhausted (step 76). The Module 36 assigns the tape drives for the mapped model types to their respective LCUs up to the capacity M of the LCU (step 78). In this case, the older but not the oldest model types will go unassigned. Furthermore, any model type whose number of attached drives exceeds the capacity M will only have the first M drives assigned.

Figure 4:
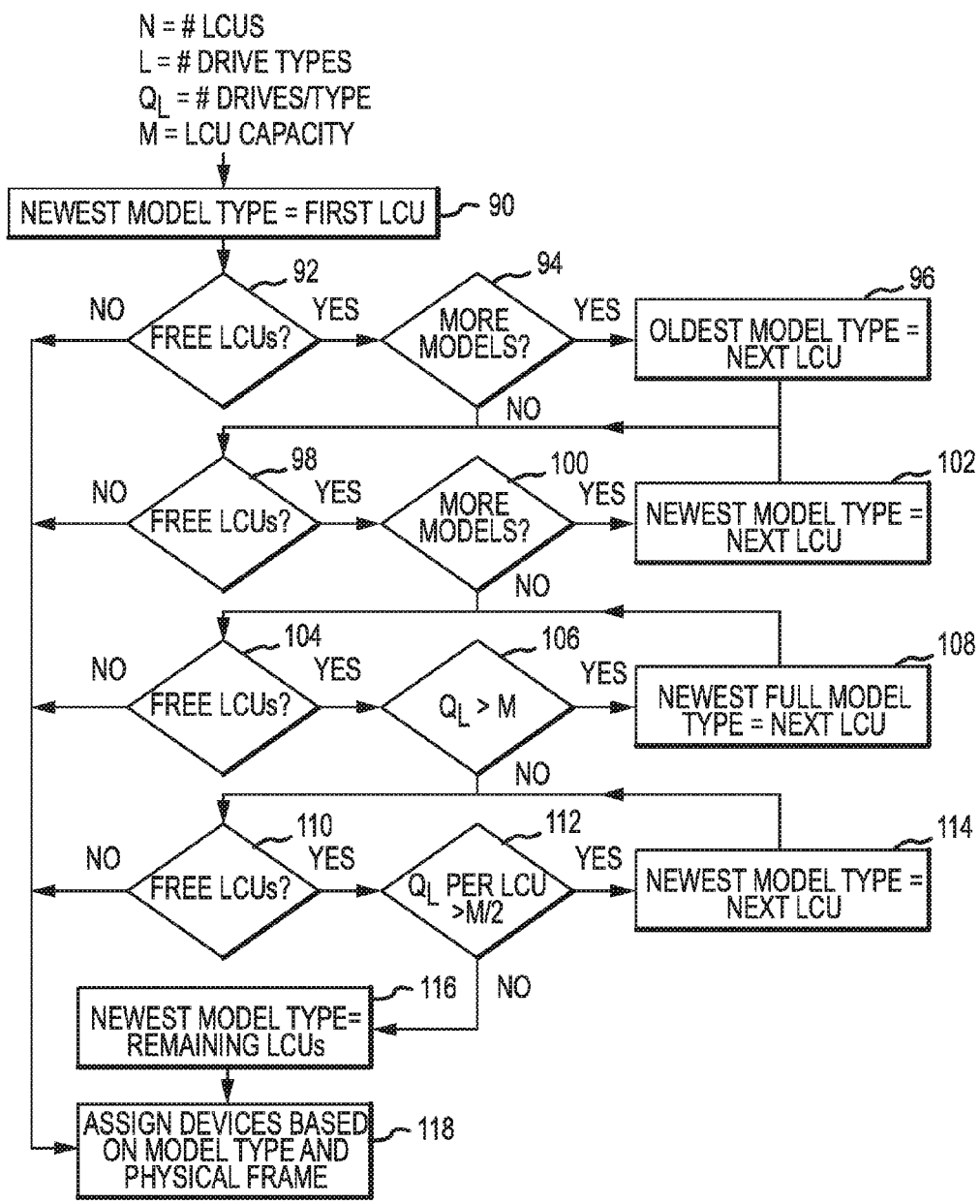
FIG. 4 is a flow diagram of another embodiment for mapping the different tape drive model types to the multiple logical control units.

With reference to FIG. 4, an embodiment of the LCU Mapping & Assignment Module 36 maps the types of tape drives to different LCUs to first ensure the newest and oldest generation model types are mapped to LCUs, then the model types newer to older are mapped to an LCU, then all of the model types with a number of attached tape drives that exceeds the capacity of the LCU are mapped to another LCU (with priority from newest to oldest), then either the highest populated model types per LCU (newest to oldest) or the newest model type are mapped to any remaining LCUs.

In an embodiment, the Module 36 implements the following steps to map L model types of $Q_L$ tape drives to N LCUs where each LCU can support a maximum of M tape drives of the same model type. The Module 36 maps the newest model type to a first LCU (step 90). If there are free modules (step 92), the Module determines whether there are more models (step 94). If yes, the Module maps the oldest model type to a next LCU (step 96), checks if there are free LCUs (step 98), checks if there are more models (step 100) and maps the next newest model type to the next LCU (step 102). The Module 36 repeats steps 98, 100 and 102 until either there is no free LCUs or no more models. Once the LCUs are all exhausted the mapping stops.

If there are no more models at step 100, the Module 36 verifies that there are free LCUs (step 104), identifies all of the model types for which the number of attached drives $Q_L$ is greater than the LCU capacity M (full model type) (step 106), maps the newest full model type to the next LCU (step 108) and repeats steps 104, 106 and 108 until either there are no free LCUs or no more full model types. Once the LCUs are all exhausted the mapping stops.

If there are no more full models at step 106, the Module 36 verifies that there are free LCUs (step 110), identifies all of the model types for which the number of attached drives $Q_L$ per LCU is greater than the one-half the LCU capacity M (step 112), maps the newest model type to the next LCU (step 114) and repeats steps 110, 112 and 114 until either there are no free LCUs or no more full models. If there are still remaining LCUs, the Module 36 maps the newest module type to the remaining LCUs (step 116).

Once the mapping is complete, the Module assigns the attached tape drives to the LCUs based on model type (step 118). For model types assigned to multiple LCUs, the Module 36 may take balance the assignment of tape drives among the multiple LCUs based on the number of attached tape drives or the physical location of the tape drives or both.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A tape storage system comprising:
   a single physical control unit (CU);
   a plurality of model types L of tape drives, each said model type being a different generation, and a number of tape drives $Q_L$ for each model type;
   a host communicating with the plurality of model types L of tape drives via the single physical control unit;
   the single physical CU configured to:
      in response to obtaining feature codes for a plurality N of logical control units (LCUs) for a customer for the single physical CU, support N LCUs, each LCU supporting communication with a single model type and a maximum of M tape drives;
      based on the number of model types L and the number of tape drives for each model type $Q_L$, map the model types to the N LCUs with priority given in the mapping to the newer generation model types and the model types where $Q_L$ is greater than M; and
      assign individual tape drives to the LCUs based on model type.

2. The tape storage system of claim 1, wherein the feature codes are an encrypted string that contains information that the code came from a provider of the LCUs and that the customer did in fact legitimately obtain the N LCUs, a serial number of the physical CU and the number of LCUs N obtained by the customer.

3. The tape storage system of claim 1, further comprising a point-of-sale (POS) module located in the physical CU, wherein the POS module is configured to issue the feature codes in response to the customer obtaining the N LCUs.

4. The tape storage system of claim 3, wherein the POS module is further configured to execute a sub-module that processes the number of model types L and the number of tape drives $Q_L$ for each model type and suggests a number of LCUs for a customer that will satisfy a customer specified constraint on the mapping of model types to the LCUs.

5. The tape storage system of claim 1, wherein the mapping of the model types to the N LCUs ensures that the oldest model type is mapped to at least one LCU.

6. The tape storage system of claim 1, wherein in mapping the model types to the N LCUs, the single physical CU is configured to:
   if N equals L, map each model type to a different one of the LCUs;
   if N less than L, map the newest model type to a first one of the LCUs, map the oldest model type to a second one of the LCUs and map the remaining model types newest to oldest to different ones of the LCUs until all the LCUs are mapped; and
   if N greater than L, map each model type to a different one of the LCUs, map model types whose $Q_L$ is greater than M to another one of the LCUs from newest to oldest model type, and map either the newest model type or the model types having the most tape drives per mapped LCU newest to oldest to any remaining LCUs.

7. The tape storage system of claim 1, wherein in mapping the model types to the N LCUS, the single physical CU is configured to:
   map the newest and oldest model types to different LCUs;
   if LCUs remain unmapped, map model types from newer to older to different LCUs;
   if LCUs remain unmapped, map the model types whose $Q_L$ is greater than M to another one of the LCUs from newest to oldest model type; and
   if LCUs remain unmapped, map either the newest model type to any remaining LCUs or map the model types having the most tape drives per mapped LCU from newest to oldest to any remaining LCUs.

8. The tape storage system of claim 1, wherein for model types mapped to more than one LCU, the individual tape drives are assigned to the multiple LCUs based on model type and the number of tape drives $Q_L$ for that model type to balance the number of drives assigned to each LCU.

9. The tape storage system of claim 1, wherein for model types mapped to more than one LCU, the individual tape drives are assigned to the multiple LCUs based on model type and a physical location of each of the tape drives to distribute drives from the same physical location to different LCUs.

10. The tape storage system of claim 1, wherein in response to the customer connecting a tape drive of a different model type to the physical CU changing the number of model types L, the single physical CU is configured to remap the model types to the N LCUs based on the new number of model types and reassign the individual tape drives to the LCUs based on model type.

11. The tape storage system of claim 1, wherein in response to the customer obtaining a different plurality N of LCUs, the single physical CU is configured to support the different number of LCUs N, remap the model types to the N LCUs based on the new number of LCUs and reassign the individual tape drives to the LCUs based on model type.

12. The tape storage system of claim 1, wherein all of the tape drives for all of the model types are contained in a single library.

* * * * *